United States Patent [19]
Fox

[11] Patent Number: 5,556,344
[45] Date of Patent: Sep. 17, 1996

[54] LIMITED SLIP DIFFERENTIAL WITH REDUCED PRELOAD

[75] Inventor: Paul F. Fox, Ft. Wayne, Ind.

[73] Assignee: Auburn Gear, Inc., Auburn, Ind.

[21] Appl. No.: 362,791

[22] Filed: Dec. 22, 1994

[51] Int. Cl.$^6$ .................................. F16H 48/22
[52] U.S. Cl. ............................ 475/235; 475/234
[58] Field of Search ........................ 475/234, 235

[56] References Cited

U.S. PATENT DOCUMENTS

| | | | |
|---|---|---|---|
| 3,365,983 | 1/1968 | Jeakle | 74/711 |
| 3,400,611 | 9/1968 | Engle | 74/710 |
| 3,815,442 | 6/1974 | McAninch | 74/711 |
| 4,612,825 | 9/1986 | Engle | 74/711 |
| 4,692,049 | 9/1987 | Engle | 403/1 |
| 5,139,467 | 8/1992 | Carpenter | 475/235 |
| 5,226,861 | 7/1993 | Engle | 475/234 |

Primary Examiner—Charles A. Marmor
Assistant Examiner—Nathan O. Jensen
Attorney, Agent, or Firm—Baker & Daniels

[57] ABSTRACT

The invention is directed to a limited slip differential, including a casing having a first clutch surface and at least two case parts, including a first case part and a second case part. An axle receiving side gear is disposed in the casing. A cone clutch associated with the side gear is disposed generally concentrically about a longitudinal axis and has a second clutch surface generally parallel with the first clutch surface. The second clutch surface is disposed at an angle of between about 3° and 7° relative to the longitudinal axis. A biasing device, such as a plurality of compression springs, biasingly engages the second clutch surface with the first clutch surface, and effects a preload force of between about −200 to +500 pounds against the side gear in a direction generally parallel to the longitudinal axis.

10 Claims, 2 Drawing Sheets

LIMITED SLIP DIFFERENTIAL WITH REDUCED PRELOAD

BACKGROUND OF THE INVENTION

1. Field of the Invention

The present invention relates to differentials, and, more particularly, to limited slip differentials.

2. Description of the Related Art

It is known that in vehicles with laterally displaced wheels, when such a vehicle makes a turn the outer wheel(s) must move further than the inner wheels and hence a direct coupling between the outer and inner wheels forcing the wheels to rotate in unison, necessarily induces some slippage between the wheels and the support surface during a turn. On the other hand, when more than one wheel receives a driving force, it is desirable that that force be transmitted as directly as possible to all of the driven wheels. One longstanding solution to this dilemma has been a conventional differential mechanism interconnecting a pair of driven wheels on a vehicle wherein each wheel is directly coupled by way of an axle shaft to a side gear within a differential housing. The side gears are in turn interconnected by a pair of beveled gears fixed by way of a cross pin to a differential case. The differential case receives the driving torque from the vehicle engine and during linear vehicle motion the differential case and axle shafts rotate in unison with no relative motion between the side gears or pinion gears. During a turning maneuver, one side gear associated with the outer wheel turns faster than the side gear coupled to the inner wheel while both wheels continue to receive driving force.

Such a conventional differential adequately solves the problem of wheel slippage on dry pavement or other comparatively hard surfaces; however, in slippery conditions such as snow or mud where one of the two driven wheels begins to slide or freely rotate, essentially no torque is transmitted to the other of the pair of driven wheels and the vehicle is stuck simply because one of its two driven wheels is allowed to slip.

One solution for preventing the problem of transmission of zero torque to one of the driven wheels is to provide a so-called "limited slip differential" which ensures that each of the wheels receives a certain ratio of the total torque applied to the wheels. An example of such a limited slip differential is disclosed in U.S. Pat. No. 4,612,825 (Engle), which is assigned to the assignee of the present invention and expressly incorporated herein by reference. In general, a pair of side gears are attached to respective cone clutches, which in turn engage clutch surfaces formed in the interior of the differential casing. An axially biasing device disposed between the side gears provides an axial preload on the side gears, which in turn effects a certain frictional resistance between the clutch surfaces of the cone clutch and the differential casing. The clutch surfaces of the cone clutch and casing are disposed at a 12.5° angle relative to the longitudinal axis of the casing, and as a result provide a certain frictional resistance which must be overcome upon initial rotation of the differential to effect relative rotational movement between the cone clutches and casing. The axially biasing device disposed between the side gears includes a plurality of compression springs which apply a total preload force of between 1,000–1,500 pounds to the axial end faces of the side gears.

Although a step forward in the art, the limited slip differential disclosed by the '825 patent has a relatively low bias ratio of about 2.0. The bias ratio is defined as the ratio of the torque applied to the higher torque wheel divided by the torque applied to the lower torque wheel. A higher bias ratio means that the axles attached to the differential act as a locked axle, i.e., there is no relative rotation between the axles when a lower total torque value is applied to the wheels. This can be advantageous in certain applications, such as sports cars. For example, the driven axles will lock together at a lower total torque value and result in each wheel having equal torque applied thereto by the differential.

A problem with increasing the bias ratio of a differential is that the frictional resistance between the clutch surfaces is increased, thereby requiring a greater torque by the differential to overcome the frictional resistance. This means that a portion of the available torque is lost due to the increased frictional resistance.

SUMMARY OF THE INVENTION

The present invention provides a limited slip differential having a cone clutch with a clutch surface disposed at an angle of between 3° and 7° relative to an axis of rotation, and a preload force of between about −200 to +500 pounds against the side gear in a direction generally parallel to the axis of rotation.

The invention comprises, in one form thereof, a limited slip differential, including a casing having a first clutch surface and at least two case parts, including a first case part and a second case part. An axle receiving side gear is disposed in the casing. A cone clutch associated with the side gear is disposed generally concentrically about a longitudinal axis and has a second clutch surface generally parallel with the first clutch surface. The second clutch surface is disposed at an angle of between about 3° and 7° relative to the longitudinal axis. A biasing device, such as a plurality of compression springs, biasingly engages the second clutch surface with the first clutch surface, and effects a preload force of between about −200 to +500 pounds against the side gear in a direction generally parallel to the longitudinal axis.

An advantage of the present invention is that the bias ratio of the differential is increased, without increasing the preload.

Another advantage is that the preload on the side gears by the compression springs is actually decreased, while at the same time increasing the bias ratio of the differential.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figures 1, 2, 3:
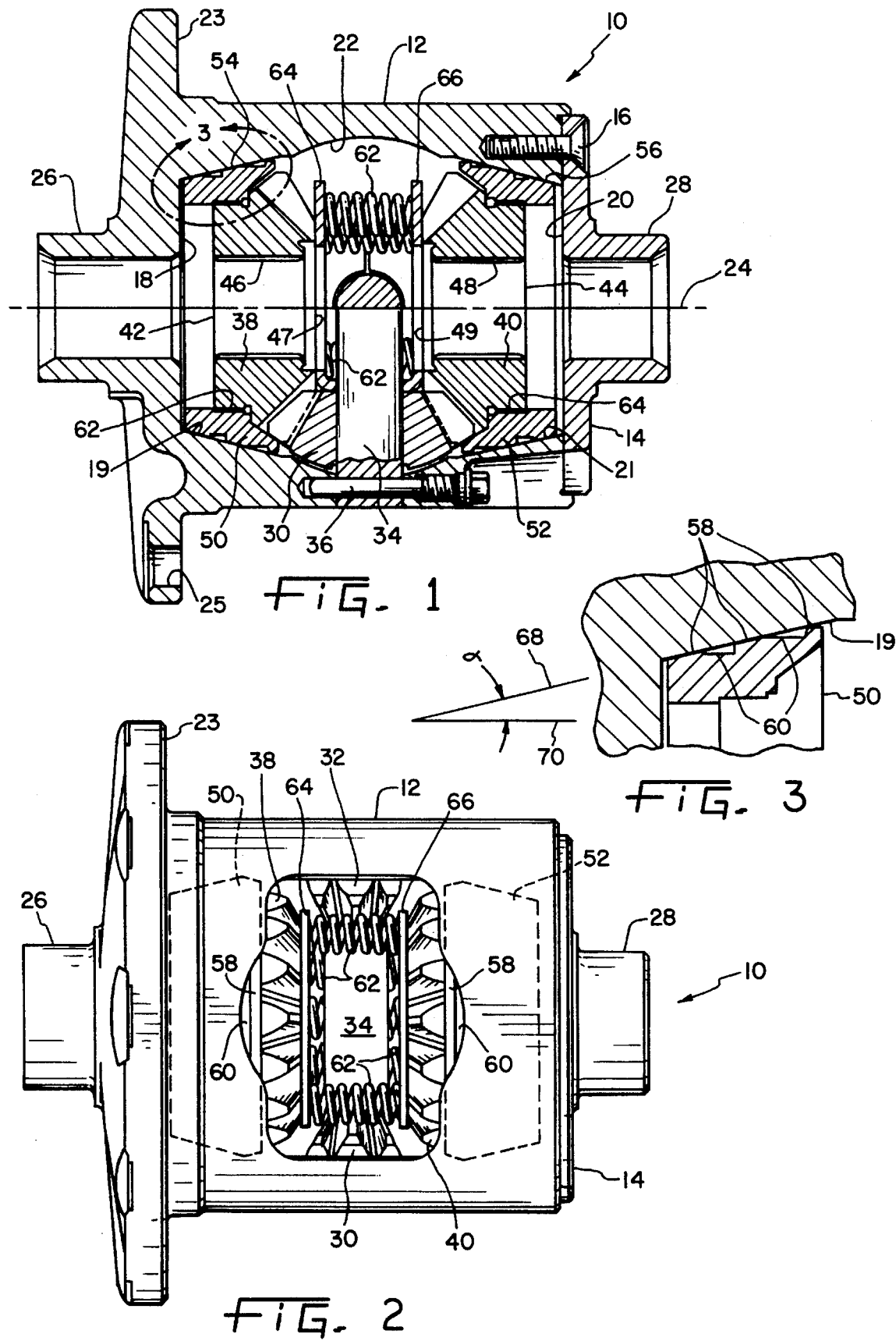
FIG. 1 is a side sectional view of an embodiment of a differential of the present invention.
FIG. 2 is a side view of the differential of FIG. 1, when viewed through the access port.
FIG. 3 an enlarged, fragmentary view of detail 3 in FIG. 1.

Referring now to the drawings, and particularly to FIGS. 1 and 2, a limited slip differential 10 of the present invention includes at least two joinable case parts 12, 14 which when fastened together, such as by screws 16, form a hollow case for differential 10. Case parts 12, 14 define a generally hollow, barrel-shaped interior with planar endwalls 18, 20 and a bulged sidewall 22 disposed generally concentrically about an axis of rotation or longitudinal axis 24. Longitudinal axis 24 also defines an axis of rotation for a pair of axle shafts (not shown) which are rotatably received within axle shaft receiving hubs 26, 28. Case part 12 includes first clutch surfaces 19, 21 (FIG. 1) which are generally frustoconical-shaped and concentrically disposed about longitudinal axis 24. Moreover, case part 12 includes a flange 23 adapted for attachment to a ring gear, such as by bolts extending through openings 25, which is rotated by an external power source, thereby causing rotation of case parts 12, 14.

Referring now to FIGS. 1 and 2, conjunctively, differential 10 has a gear assembly disposed therein, including a pair of pinion gears 30, 32 journalled on a cross pin 34 which diametrically spans the interior of differential 10 at a location which is generally midway between endwalls 18, 20. Cross pin 34 is locked in position within case part 12 of differential 10 with a partially threaded pin 36, preventing movement of cross pin 34 in a radial direction.

Side gears 38, 40 are rotatably disposed within differential 10, and are positioned concentrically about longitudinal axis 24. Side gears 38, 40 mesh with each of pinion gears 30, 32. Side gears 38, 40 each include an axle receiving opening 42, 44 having a plurality of internal splines 46, 48. Internal splines 46, 48 mate with external splines formed in the ends of the axle shafts mentioned above. Side gears 38, 40 also define axial end faces 47, 49, respectively.

A pair of cone clutches 50, 52 are operably associated with side gears 38, 40, respectively, and concentrically disposed about longitudinal axis 24. Each cone clutch 50, 52 defines a second clutch surface 54, 56, including a plurality of lands 58 and grooves 60 (FIGS. 2 and 3). Second clutch surfaces 54, 56 are disposed generally adjacent to and parallel with first clutch surfaces 19, 21. Cone clutches 50, 52 are connected to side gears 38, 40 via a plurality of splines 62, 64. Alternatively, cone clutches 50, 52 may be fastened to side gears 38, 40 using an alternate method of attachment, such as by bolts, or may be integrally formed with side gears 38, 40.

Disposed between side gears 38, 40 is a biasing device which engages end faces 47, 49 of side gears 38, 40. In the embodiment shown, the biasing device includes a plurality of compression springs 62 disposed between plates 64, 66, which in turn are engaged with axial end faces 47, 49, respectively. In the embodiment shown, 5 compression springs 62 are non-equidistantly spaced about longitudinal axis 24 (i.e., three springs on one side of cross pin 34 and two springs on an opposite side of cross pin 34) and exert an axial preload against side gears 38, 40 (through plates 64, 66) in a direction generally parallel to longitudinal axis 24. Side gears 38, 40 in turn impart a preload force between first clutch surfaces 19, 21 and second clutch surfaces 54, 56.

In accordance with the present invention, and referring now to FIG. 3, cone clutch 50 of the present invention is shown in greater detail; it being understood that cone clutch 52 is similarly constructed. In general, first clutch surface 19 and the second clutch surface defined by lands 58 and grooves 60 are disposed generally parallel to each other and at an angle $\alpha$ to longitudinal axis 24. In FIG. 3, reference line 68 is parallel to first clutch surface 19, and reference line 70 is parallel to longitudinal axis 24. By changing the angle e of the clutch surfaces, the bias ratio of the differential is likewise changed. For example, with a limited slip differential, different torques are applied to each wheel during certain driving conditions, such as in a turning maneuver or at vehicle acceleration where the road surfaces under each driven wheel are different. More particularly, the driven axles of the differential lock together (i.e., there is no relative rotation between the side gears) at a particular torque value, dependent upon the bias ratio of the differential. Generally speaking, the higher the bias ratio, the lower the torque value at which the driven axles act as a solid axle. For certain applications, such as sports cars, this can be advantageous or desirable to a user. For conventional designs, it has been found that an angle of 12½° between the clutch surfaces and the longitudinal axis of the differential corresponds to a bias ratio providing an adequate compromise of performance characteristics.

Decreasing the angle between the clutch surfaces and the longitudinal axis of the differential results in a differential having an increased bias ratio. A disadvantage with decreasing the angle between the clutch surfaces and the longitudinal axis of the differential is that the amount of torque required to overcome the frictional resistance between the clutch surfaces is increased as the angle is decreased. More particularly, it is known in the art that the amount of torque required to overcome the frictional resistance between the clutch surfaces of a cone clutch is represented in one form by the equation:

$$T = \frac{F*\mu}{3(\sin\alpha)} * \frac{(D^3 - d^3)}{(D^2 - d^2)} ; \quad (A)$$

where:

T=torque required to overcome frictional resistance between clutch surfaces,

F=axial force applied to cone clutch,

μ=coefficient of friction between clutch surfaces,

D=diameter of cone clutch surface at widest point, d=diameter of cone clutch surface at narrowest point, and α=angle between cone clutch surface and longitudinal axis.

For purposes of discussion, it is assumed that the widest and narrowest diameter of the clutch surface do not change. Moreover, it is also known in the art that theoretically speaking, the length of the clutch surface does not affect the value T. Thus, the quantity $(D^3-d^3)/(D^2-d^2)$ is neglected herein.

Changing the angle between the clutch surfaces and the longitudinal axis results in taking the sine of a smaller angle, which results in a smaller fractional, value between zero (0) and one (1). Since the quantity α is in the denominator of equation (A) above, this results in an increase in the required torque value as the angle is decreased. For example, assuming a constant axial load is applied to the side gears, reducing the angle α from 12.5° to 5° changes the amount of torque required to overcome the frictional resistance between the clutch surfaces by a ratio of about 2.5:1. Thus, although decreasing the angle has the advantage of increasing the bias ratio of the transmission, it also has the disadvantage of substantially increasing the amount of torque required to overcome the frictional resistance between the clutch surfaces. This increased torque value may result in increased surface wear or chatter between the clutch surfaces.

With past attempts to improve the bias ratio of the transmission, when the angle between the clutch surfaces and the longitudinal axis of the differential was decreased, the same biasing device was maintained between the side gears, such as the plurality of compression springs 62. The inventors of the present invention have recognized that it is possible to improve the bias ratio of the differential while at the same time avoiding the disadvantages associated therewith. To wit, while decreasing the angle α between the clutch surfaces and the longitudinal axis from the conventional 12.5° to a smaller angle, such as between 3° and 7° the axial preload exerted on side gears 38, 40 and between clutch surfaces 19, 21 and second clutch surfaces 54, 56 has also been reduced by using compression springs 62 in fewer number or which are less stiff. With conventional designs having an angle α of 12.5° a plurality of compression springs exert a preload force in an axial direction on side gears 38, 40 of between 1,000 to 1,500 pounds total. Reducing the angle α from 12.5° to 5° and using such conventional compression springs would result in an amplification of the force perpendicular to the clutch surfaces on the order of 11.5:1, thereby requiring an increased torque on the order of 11.5:1 to overcome the frictional resistance between the clutch surfaces.

On the other hand, with the embodiment of present invention illustrated in FIGS. 1–3, using an angle α between the clutch surfaces and the longitudinal axis of 5°, a plurality of compression springs exert a preload force of less than about 500 pounds against side gears 38, 40. Nonetheless, because of the load amplification factor indicated above associated with changing from a 12.5° angle to a 5° angle, the preload between first clutch surfaces 19, 21 and second clutch surfaces 54, 56 is maintained at a relatively high amount, while the axial compression loading on the side gears is relatively low. Thus, by using a lesser number of compression springs, or a plurality of compression springs which are less stiff, the amount of torque which is required to overcome the frictional resistance between the clutch surfaces of the cone clutch and case may be modified as the product application requires by adjusting the size and/or quantity of compression springs 62.

Figure 4:
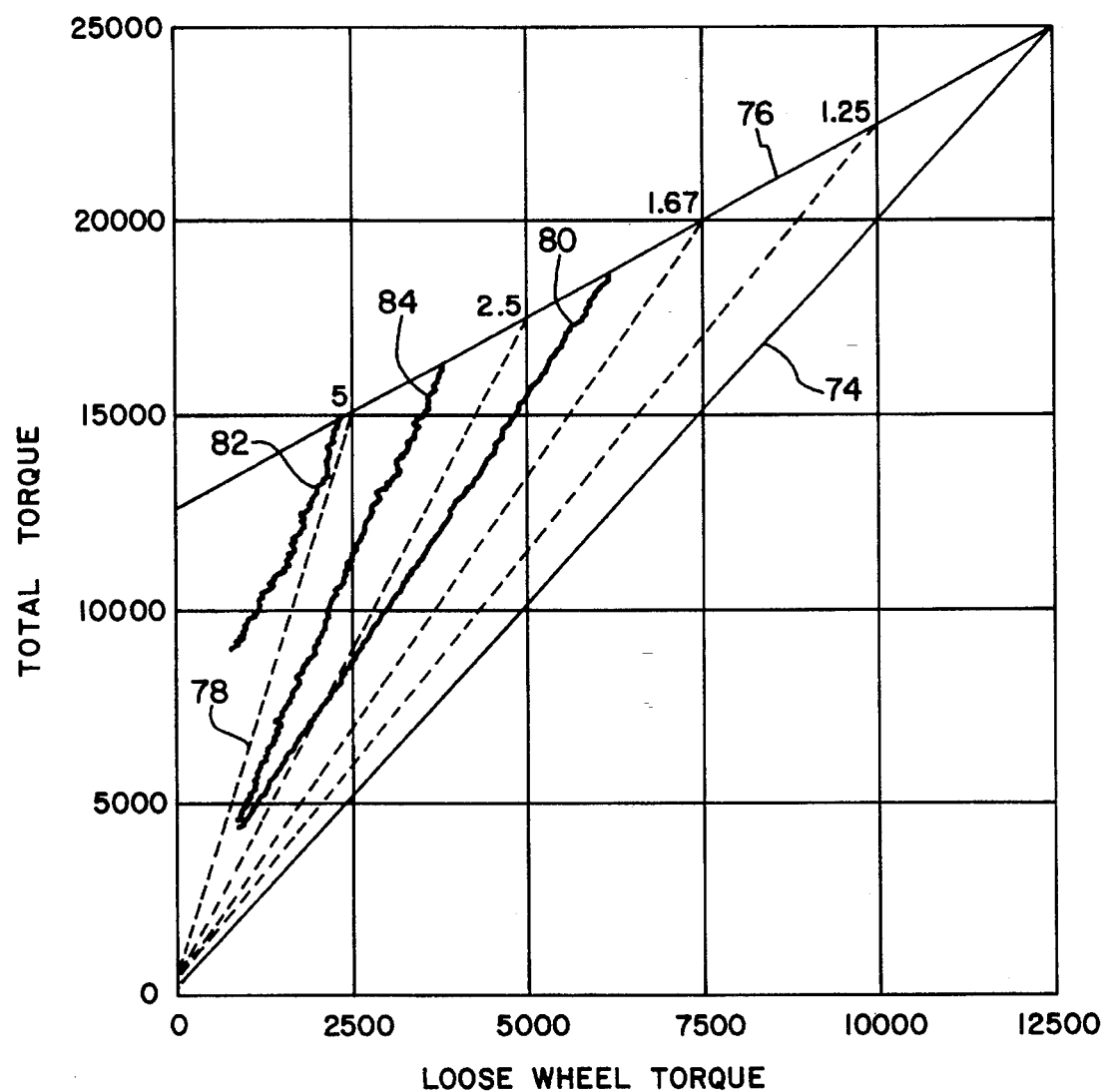
FIG. 4 a chart illustrating performance characteristics for a differential of the present invention, as compared to a conventional differential.

Referring now to FIG. 4, a graph showing performance characteristics for differently configured differentials is illustrated. Reference line 74 corresponds to that of an open differential in which an equal amount of torque is applied to each wheel. Reference line 76 corresponds to the locked line at which both axles function as a solid axle, i.e., there is no relative rotation between the side gears of the differential. The dashed lines represent theoretical performance characteristics for transmissions having various bias ratios. For example, dashed line 78 having a bias ratio of about 5 is calculated by the quantity (15,000–2,500)/2,500=5. Performance curve 80 corresponds to a differential having an angle of 12.5° between the clutch surfaces and the longitudinal axis, and a standard spring stiffness. As is apparent, performance curve 80 would intersect the Y axis at a location about midway between zero and 5,000. In contrast, performance curve 82 corresponds to a differential having a 5° angle between the clutch surfaces and the longitudinal axis and a plurality of standard springs as used for the differential corresponding performance curve 80. As is apparent, performance curve 82 would extend to a point that is well above the 5,000 mark on the Y axis, thereby indicating a substantial preload when compared to performance curve 80.

Referring now to performance curve 84, a differential having a reduced angle of 5° between the clutch surfaces and the longitudinal axis, but with a much lighter spring than the conventional spring used in the differentials corresponding to performance curves 80 and 82 is shown. As is apparent, the bias ratio (i.e., the slope for each of performance curves 82 and 84) is about the same. Nonetheless, performance curve 84 would extend to a point on the Y axis at a location which is equal to or less than that of performance curve 80. Thus, with the present invention, a high bias ratio may be realized while at the same time having a low axial preload on the side gears of the differential.

In the embodiment shown in the drawings, springs 62 are compression springs which exert an axial force on side gears 38, 40 in the range of 0–500 pounds. However, it is also possible that springs 62 could be tension springs which are attached to side gears 38, 40 and apply a negative axial load thereto. For example, springs 62 could be tension springs which are attached to plates 64, 66, which in turn could be attached to end faces 47, 49 of side gears 38, 40, respectively, and apply an axial tension loading on side gears 38, 40 in the range of 0 to −200 pounds.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A limited slip differential, comprising:

a casing having at least two case parts, including a first case part and a second case part, said casing having a first clutch surface;

an axle receiving side gear disposed in said casing;

a cone clutch associated with said side gear, said cone clutch disposed generally concentrically about a longitudinal axis and having a second clutch surface generally parallel with and disposed adjacent to said first clutch surface, said second clutch surface disposed at an angle of between about 3° and 7° relative to said longitudinal axis; and means for biasing said second clutch surface with respect to said first clutch surface, said biasing means effecting a preload force of between about −200 to +500 pounds against said side gear in a direction generally parallel to said longitudinal axis.

2. The limited slip differential of claim 1, wherein said first clutch surface is frustroconical-shaped.

3. The limited slip differential of claim 1, wherein said first and second clutch surfaces are disposed at an angle of about 5° relative to said longitudinal axis.

4. The limited slip differential of claim 1, wherein said biasing means comprises at least one spring engaging said side gear.

5. The limited slip differential of claim 4, wherein said at least one spring comprises a plurality of compression springs engaging said side gear.

6. A limited slip differential, comprising:

a casing having at least two case parts, including a first case part and a second case part, said casing having two clutch surfaces;

a pair of axle receiving side gears disposed in said casing, said side gears disposed generally coaxially with each other about a longitudinal axis;

a pair of cone clutches associated with said side gears, respectively, said cone clutches being respectively disposed adjacent to said clutch surfaces, each said cone clutch and said clutch surface disposed generally concentrically about said longitudinal axis, said clutch surfaces disposed at an angle of between about 3° and 7° relative to said longitudinal axis; and means for biasing each said side gear and cone clutch with respect to said respective adjacent clutch surfaces, said biasing means effecting a preload force of between about −200 to +500 pounds against said side gears in a direction generally parallel to said longitudinal axis.

7. The limited slip differential of claim 6, wherein said clutch surfaces are frustroconical-shaped.

8. The limited slip differential of claim 6, wherein said clutch surfaces are disposed at an angle of about 5° relative to said longitudinal axis.

9. The limited slip differential of claim 6, wherein said biasing means comprises at least one spring disposed between said side gears.

10. The limited slip differential of claim 9, wherein said at least one spring comprises a plurality of compression springs disposed between and engaging each of said side gears.

* * * * *